(12) United States Patent
Mori et al.

(10) Patent No.: US 11,320,287 B2
(45) Date of Patent: May 3, 2022

(54) ELECTROMAGNETIC INDUCTION TYPE ENCODER

(71) Applicant: MITUTOYO CORPORATION, Kanagawa (JP)

(72) Inventors: Hiroatsu Mori, Tochigi (JP); Kenichi Hayashi, Kanagawa (JP); Naoki Kobayashi, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 151 days.

(21) Appl. No.: 16/896,842

(22) Filed: Jun. 9, 2020

(65) Prior Publication Data

US 2020/0393271 A1 Dec. 17, 2020

(30) Foreign Application Priority Data

Jun. 12, 2019 (JP) .............................. JP2019-109922

(51) Int. Cl.
*G01B 7/14* (2006.01)
*G01B 7/30* (2006.01)
*H01F 5/00* (2006.01)
*G01D 5/20* (2006.01)
*G01B 7/00* (2006.01)
*G08B 21/18* (2006.01)
*G01B 3/20* (2006.01)

(52) U.S. Cl.
CPC ............ *G01D 5/2066* (2013.01); *G01B 3/205* (2013.01); *G01B 7/003* (2013.01); *G01D 5/2053* (2013.01); *G08B 21/182* (2013.01)

(58) Field of Classification Search
CPC .... G01D 5/2066; G01D 5/2053; G01D 5/206; G01D 5/245; G01B 3/205; G01B 7/003; G08B 21/182
USPC ..... 324/51, 55, 200, 207.11, 207.13, 207.15, 324/207.16
See application file for complete search history.

(56) References Cited

U.S. PATENT DOCUMENTS

| 2019/0140481 | A1* | 5/2019 | Keeling | ................ | H02J 50/60 |
| 2020/0109966 | A1* | 4/2020 | Kubozono | ............ | G01D 5/206 |
| 2020/0240812 | A1* | 7/2020 | Kubozono | ............ | G01D 5/245 |

FOREIGN PATENT DOCUMENTS

| JP | 2001-255106 | 9/2001 |
| JP | 2016-206086 | 12/2016 |
| JP | 2018-077297 | 5/2018 |

* cited by examiner

*Primary Examiner* — Raul J Rios Russo
(74) *Attorney, Agent, or Firm* — Rankin, Hill & Clark LLP

(57) ABSTRACT

An electromagnetic induction type encoder, wherein at least one of widths of a first transceiver coil, a first plurality of conductors and a first receiver coil of a first track in a direction vertical to facing direction between a detection head and a scale and a measurement direction is different from corresponding width of a second transceiver coil, a second plurality of conductors and a second receiver coil in the direction vertical to the facing direction and the measurement direction.

5 Claims, 11 Drawing Sheets

ELECTROMAGNETIC INDUCTION TYPE ENCODER

CROSS-REFERENCE TO RELATED APPLICATION

This application is based upon and claims the benefit of priority of the prior Japanese Patent Application No. 2019-109922, filed on Jun. 12, 2019, the entire contents of which are incorporated herein by reference.

FIELD

A certain aspect of embodiments described herein relates to an electromagnetic induction type encoder.

BACKGROUND

There is known electromagnetic induction type encoders for detecting a relative displacement amount between a detection head and a scale (for example, see Japanese Patent Application Publication No. 2001-255106, and Japanese Patent Application Publication No. 2016-206086).

SUMMARY

In the electromagnetic induction type encoder, the detection head relatively moves with respect to the scale. The detection head and the scale face with each other through a small gap. However, when a positional relationship between the detection head and the scale fluctuates, the detection head may hit against the scale during sliding. And so, it is requested that the positional relationship is detected and the detected positional relationship is reported. However, it is difficult to add a new sensor for detection or add a new pattern for detection, from a viewpoint of cost or space.

In one aspect of the present invention, it is an object to provide an electromagnetic induction type encoder that is capable of detecting positional fluctuation between a detection head and a scale with a simple structure.

According to an aspect of the present invention, there is provided an electromagnetic induction type encoder including: a detection head; and a scale that faces with the detection head and is configured to relatively move with respect to the detection head in a measurement direction, wherein the detection head has a first transceiver coil that is used for a first track and is configured to generate magnetic flux and a second transceiver coil that is used for a second track and is configured to generate magnetic flux, wherein the scale has a first plurality of conductors that are used for the first track, are arrayed in the measurement direction, are configured to be electromagnetically coupled with the magnetic flux generated by the first transceiver coil, and generate magnetic flux that fluctuates in a predetermined spatial period in the measurement direction and a second plurality of conductors that are used for the second track, are arrayed in the measurement direction, are configured to be electromagnetically coupled with the magnetic flux generated by the second transceiver coil, and generate magnetic flux that fluctuates in a predetermined spatial period in the measurement direction, wherein the detection head has a first receiver coil configured to be electromagnetically coupled with the magnetic flux generated by the first plurality of conductors and detect a phase of the magnetic flux and a second receiver coil configured to be electromagnetically coupled with the magnetic flux generated by the second plurality of conductors and detect a phase of the magnetic flux, wherein at least one of widths of the first transceiver coil, the first plurality of conductors and the first receiver coil of the first track in the direction vertical to the facing direction between the detection head and the scale and the measurement direction is different from corresponding width of the second transceiver coil, the second plurality of conductors and the second receiver coil in the direction vertical to the facing direction and the measurement direction.

DESCRIPTION OF EMBODIMENTS

Figure 1A:
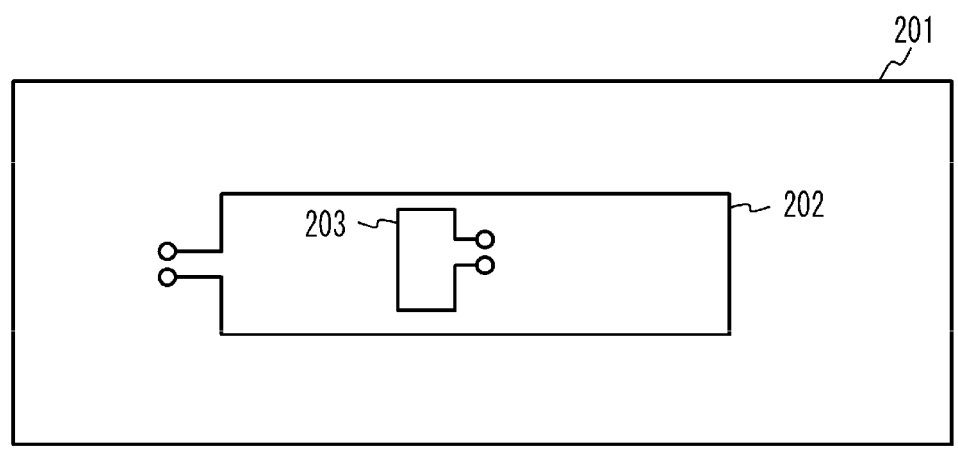
FIG. 1A illustrates a detection head.
Figure 1B:
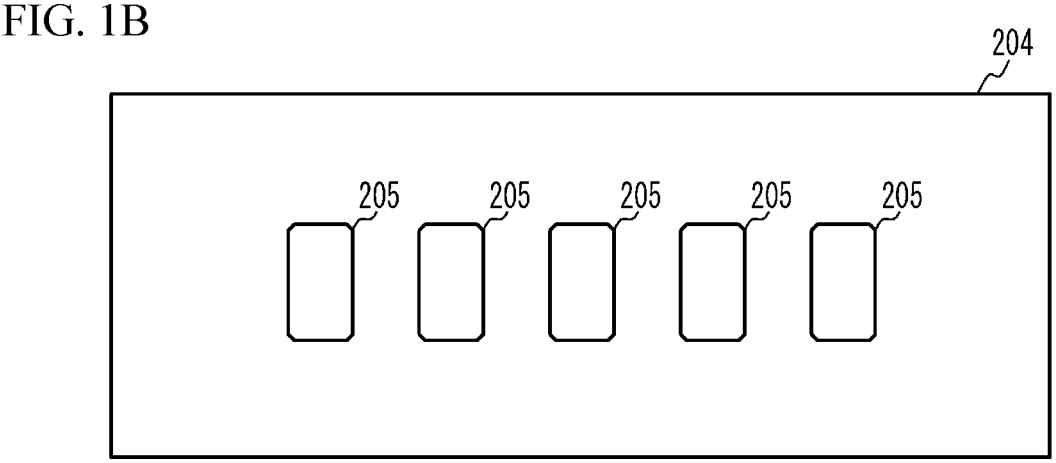
FIG. 1B illustrates a scale.

A description will be given of an outline of an electromagnetic induction type encoder, before describing embodiments. FIG. 1A illustrates a detection head 201. FIG. 1B illustrates a scale 204. The detection head 201 and the scale 204 have a flat plate shape and face with each other through a predetermined gap.

As illustrated in FIG. 1A, the detection head 201 has a transceiver coil 202, a receiver coil 203 and so on. The transceiver coil 202 is a rectangular coil. The receiver coil 203 is inside of the transceiver coil 202.

As illustrated in FIG. 1B, in the scale 204, a plurality of connection coils 205 are periodically arrayed along a measurement axis. Each of the connection coils 205 is spaced from each other and is insulated from each other. The connection coils 205 are electromagnetically coupled with the transceiver coil 202 and are also electromagnetically coupled with the receiver coil 203.

A current is provided to the transceiver coil 202. The current generates an electromotive force in the receiver coil 203 through the connection coils 205. When the electromotive force is measured, the displacement amount of the scale 204 along the measurement axis is measured.

In the electromagnetic induction type encoder, the detection head 201 relatively moves with respect to the scale 204. The detection head 201 and the scale 204 face with each other through a small gap. When heave, distortion, inclination or the like occurs in the scale 204 or a slide structure, signal intensity decreases or increases and measurement accuracy may be degraded. When a positional relationship between the detection head 201 and the scale 204 largely fluctuates because of chronological change of the encoder or installation error, the detection head 201 may hit against the scale 204 during sliding.

It is therefore favorable that the gap between the detection head 201 and the scale 204 in installation or during sliding or a relative positional shift between the detection head 201 and the scale 204 in a direction vertical to the facing direction and the measurement axis are detected and the detected results are reported. However, downsizing of the detection head 201 and the scale 204 is requested in many cases. It is difficult to newly add a sensor or add a pattern for detection, from a viewpoint of cost and space.

And so, in the following embodiments, a description will be given of an electromagnetic induction type encoder that is capable of detecting positional fluctuation between a detection head and a scale with a simple structure.

Figure 2:
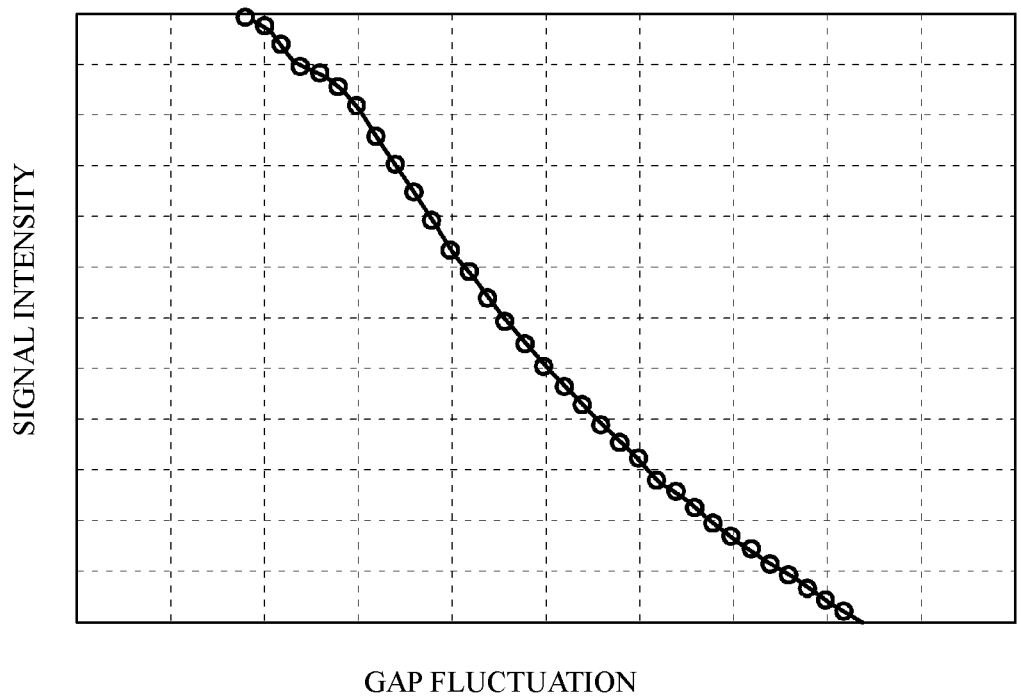
FIG. 2 illustrates correlation between gap fluctuation between a detection head and a scale, and intensity of a detected signal.

(First Embodiment) FIG. 2 illustrates correlation between gap fluctuation between a detection head and a scale, and intensity of a detected signal obtained from a receiver coil. In FIG. 2, a horizontal axis indicates gap fluctuation [mm]. A vertical axis indicates signal intensity. As illustrated in FIG. 2, when the gap increases, the signal intensity decreases. When the gap decreases, the signal intensity increases.

However, the signal intensity fluctuates when the scale is shifted in a direction vertical to a facing direction between the detection head and the scale and the measurement axis. And so, it is favorable that influence of positional shift of the scale in the direction vertical to the facing direction between the detection head and the scale and the measurement axis is separated, from a viewpoint of accurate detection of the gap between the detection head and the scale.

Figure 3A:
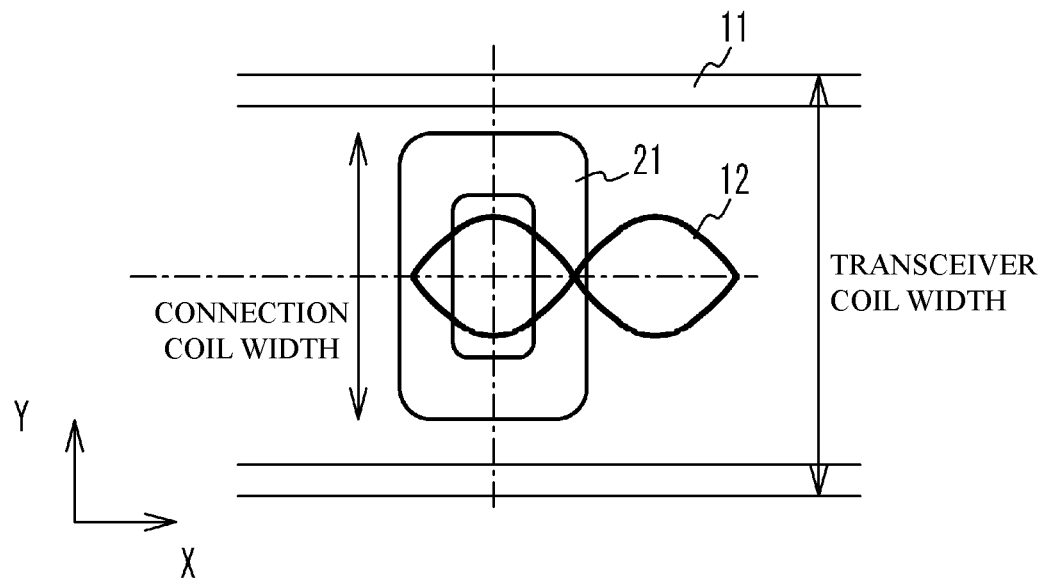
FIG. 3A illustrates a case where a center of a receiver coil coincides with a center of a connection coil in a positional relationship between a detection head and a scale.

FIG. 3A illustrates a case where a center of the receiver coil 12 coincides with a center of the connection coil 21 in a positional relationship between the detection head and the scale in the Y-axis direction. In FIG. 3A, the X-axis indicates a movement direction of the scale which is the measurement axis. The Y-axis indicates an axis vertical to the X-axis in a plane of the scale. That is, the Y-axis direction is vertical to the facing direction between the detection head and the scale. The Y-axis is also vertical to the X-axis. The positional relationship of FIG. 3A is a theoretical position where signal intensity becomes maximum. The positional relationship is referred to as a standard position.

Figure 3B:
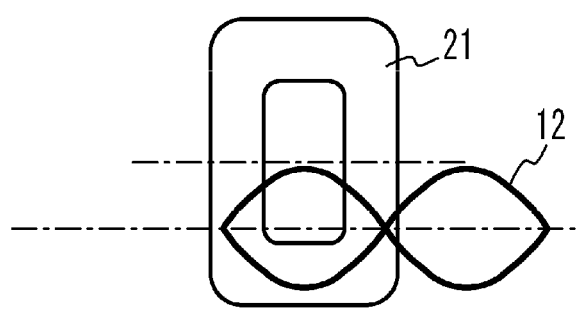
FIG. 3B illustrates a case where a receiver coil is shifted in a Y-axis direction from positional relationship of FIG. 3A.
Figure 4A:
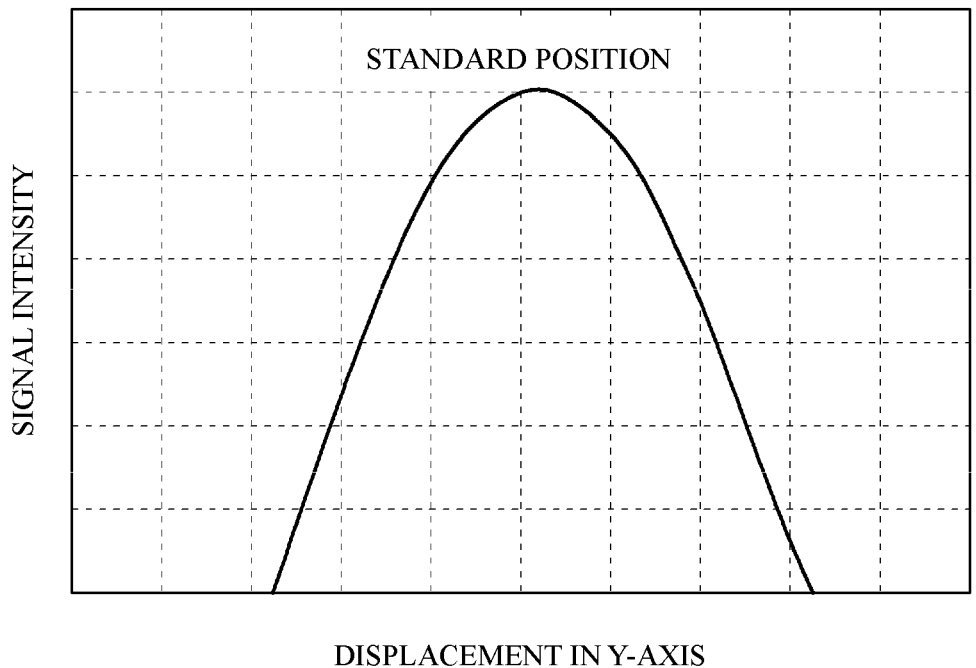
FIG. 4A illustrates a relationship between positional fluctuation of a receiver coil in a Y-axis direction and signal intensity.

FIG. 3B illustrates a case where the receiver coil 12 is shifted in the Y-axis direction from the positional relationship of FIG. 3A. Even if the receiver coil 12 is shifted in the Y-axis direction, the signal intensity is reduced. FIG. 4A illustrates a relationship between the positional fluctuation of the receiver coil 12 in the Y-axis direction and the signal intensity. As illustrated in FIG. 4A, the signal intensity becomes maximum at the standard position. The signal intensity becomes lower as the receiver coil 12 moves in the Y-axis direction from the standard position.

Figure 3C:
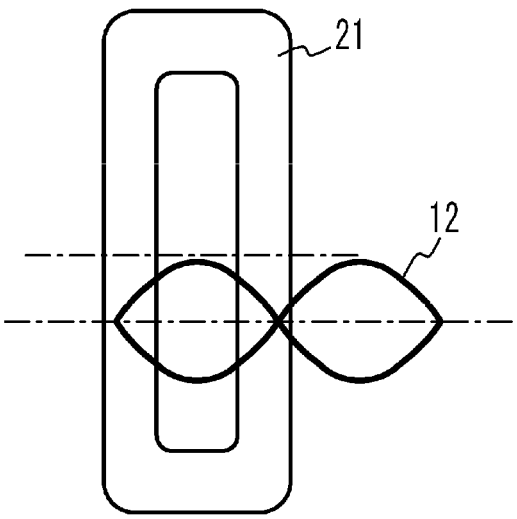
FIG. 3C illustrates a case where a width of a connection coil in a Y-axis direction is enlarged.
Figure 4B:
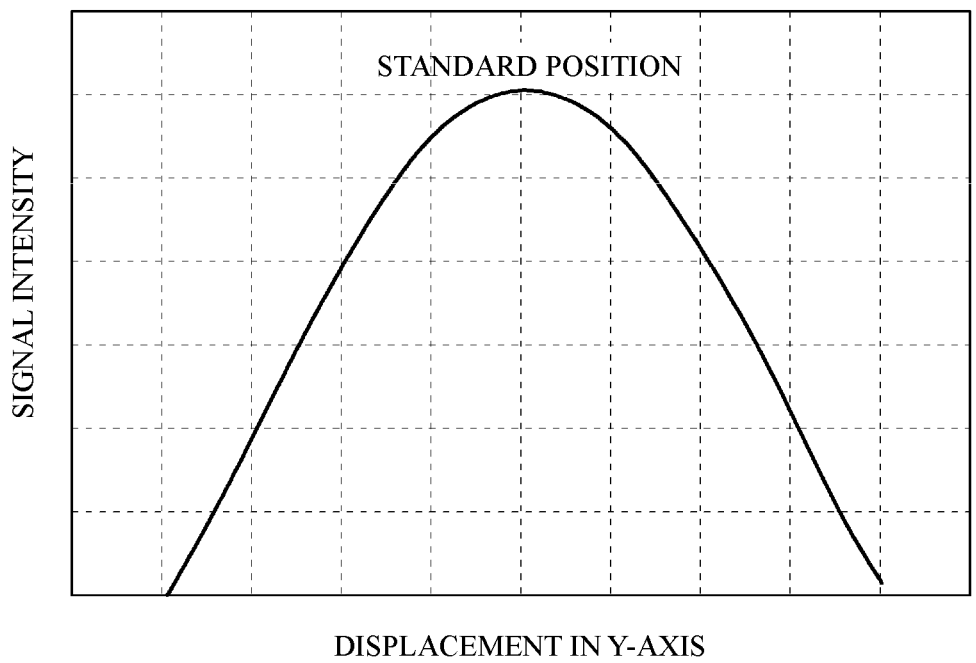
FIG. 4B illustrates a relationship between positional fluctuation of a receiver coil in a Y-axis direction and signal intensity, in a case of FIG. 3C.

FIG. 3C illustrates a case where a width of the connection coil 21 in the Y-axis direction is enlarged. FIG. 4B illustrates a relationship between the positional fluctuation of the receiver coil 12 in the Y-axis direction and the signal intensity, in the case of FIG. 3C. As illustrated in FIG. 4B, the signal intensity becomes maximum at the standard position. The signal intensity becomes lower as the receiver coil 12 moves in the Y-axis direction from the standard position. However, reduction degree of the signal intensity with respect to the displacement amount from the standard position of FIG. 4A is different from that of FIG. 4B. In concrete, when the width of the connection coil 21 in the Y-axis direction is enlarged, the reduction degree of the signal intensity with respect to the displacement amount from the standard position is small. And so, in the embodiment, the comparison result of the signal intensity is used.

Figure 5A:
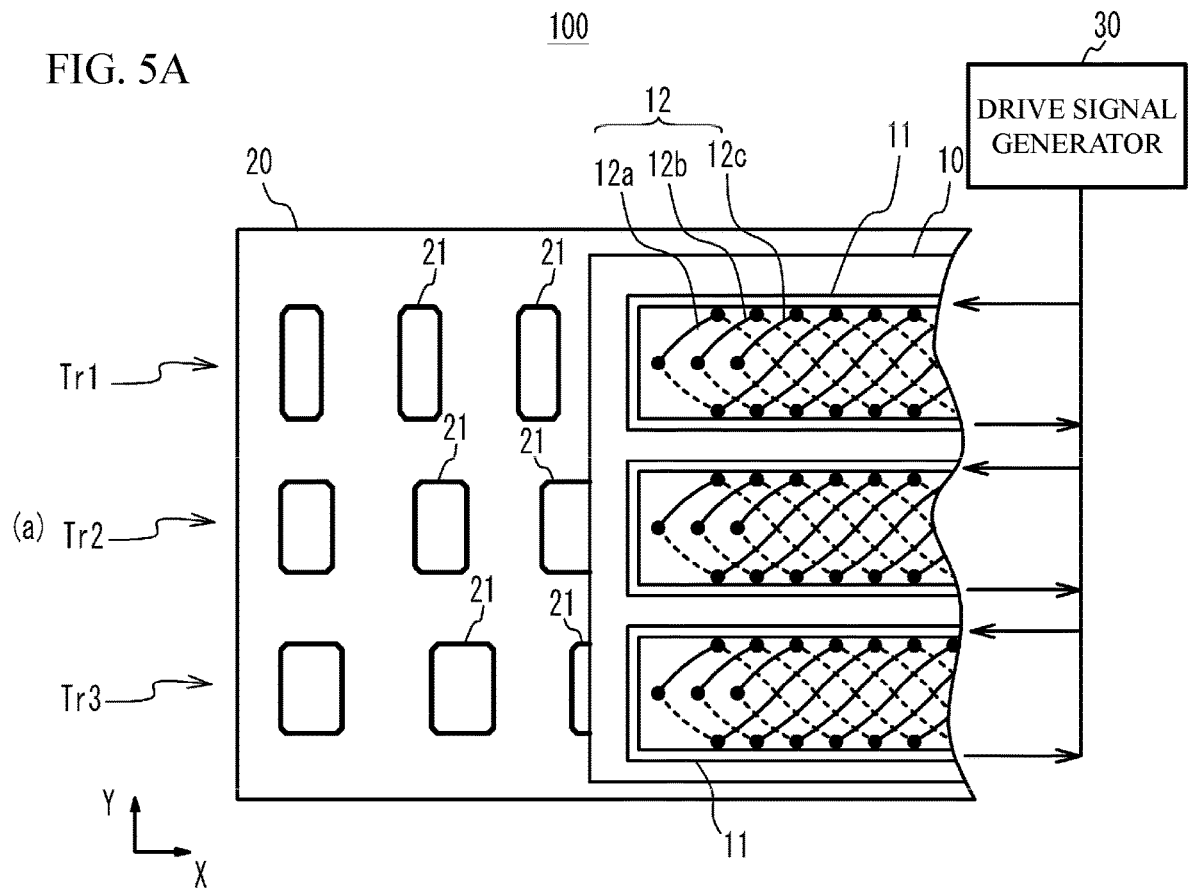
FIG. 5A illustrates a structure of an electromagnetic induction type encoder.
Figure 5B:
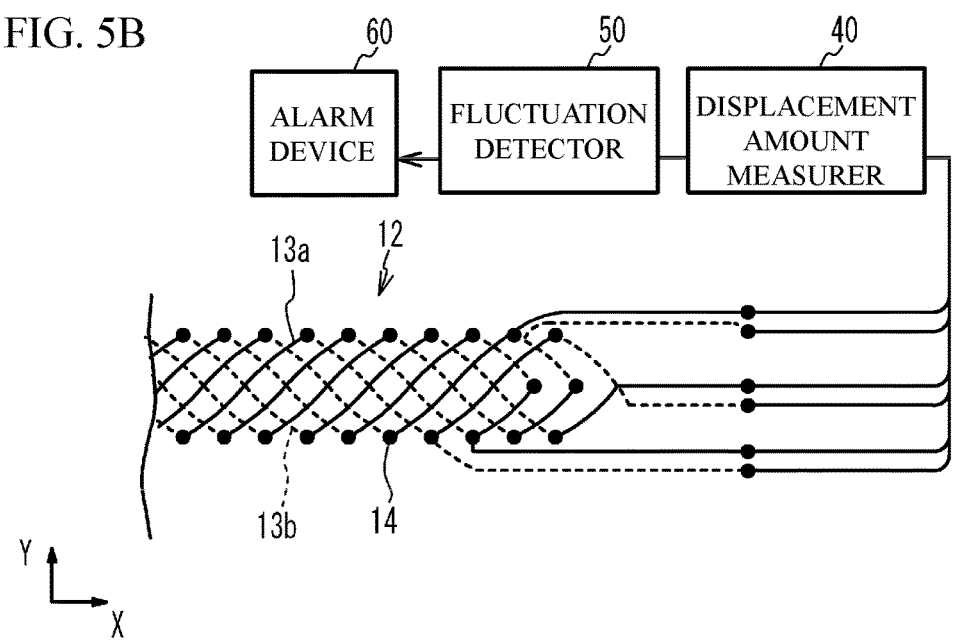
FIG. 5B illustrates a structure of a receiver coil.

FIG. 5A illustrates a structure of an electromagnetic induction type encoder 100 using electromagnetic connection between a detection head and a scale. FIG. 5B illustrates the receiver coil 12.

The electromagnetic induction type encoder 100 has a detection head 10 and a scale 20. The detection head 10 relatively moves in a measurement axis direction with respect to the scale 20. The detection head 10 and the scale 20 have a flat plate shape and face with each other through a predetermined gap. The electromagnetic induction type encoder 100 has a drive signal generator 30, a displacement amount measurer 40, a fluctuation detector 50, an alarm device 60 and so on. In FIG. 5A and FIG. 5B, an X-axis indicates a movement direction of the scale 20 (measurement axis). A Y-axis is vertical to the X-axis in a plane formed by the scale 20. The Y-axis is vertical to the facing direction between the detection head 10 and the scale 20. The Y-axis is also vertical to the X-axis.

The detection head 10 has a transceiver coil 11, receiver coils 12 and so on. The transceiver coil 11 is a rectangular coil of which a longitudinal direction is the X-axis. As illustrated in FIG. 5B, the receiver coils 12 form a detection loop repeated in a fundamental period λ of the detection head 10 in the X-axis direction, by positive sine wave patterns and negative sine wave patterns of the fundamental period λ that are formed by two patterns 13a and 13b formed on both faces of the detection head 10 and through wirings 14 connecting the pattern 13a and the pattern 13b, inside of the transceiver coil 11. In the embodiment, for example, the receiver coils 12 include three-phase receiver coils 12a to 12c of which a spatial phase is shifted to each other in the X-axis direction. The receiver coils 12a to 12c are connected through a star connection.

In the scale 20, a plurality of connection coils 21 having a rectangular shape are arrayed in the fundamental period λ along the X-axis. Each of connection coils 21 is a closed loop coil. The connection coils 21 are electromagnetically coupled with the transceiver coil 11 and are also electromagnetically coupled with the receiver coil 12.

The drive signal generator 30 generates a drive signal of a single phase AC and supplies the generated drive signal to the transceiver coil 11. In this case, magnetic flux is generated in the transceiver coil 11. Thus, an electromotive current is generated in the plurality of connection coils 21. The plurality of connection coils 21 are electromagnetically coupled with the magnetic flux generated by the transceiver coil 11 and generate magnetic flux fluctuating in the X-axis direction in a predetermined spatial period. The magnetic flux generated by the connection coils 21 generates an electromotive current in the receiver coils 12a to 12c. The electromagnetic coupling among each coil fluctuates in accordance with the displacement amount of the detection head 10. Thereby, a sine wave signal of the same period as the fundamental period λ is obtained. Therefore, the receiver coil 12 detects a phase of the magnetic flux generated by the plurality of connection coils 21. The displacement amount measurer 40 can use the sine wave signal as a digital amount of a minimum resolution by electrically interpolating the sine wave signal. Thereby, the displacement amount measurer 40 measures the displacement amount of the detection head 10.

One track is structured by the transceiver coils 11, the receiver coils 12 and the connection coils 21 that are electromagnetically coupled with each other. In the embodiment, the electromagnetic induction type encoder 100 has a plurality of tracks Tr1 to Tr3. The plurality of tracks Tr1 to Tr3 are arrayed at a predetermined interval in the Y-axis direction. Fundamental periods λ are different from each other in the tracks Tr1 to Tr3. Thus, the electromagnetic induction type encoder 100 acts as an absolute type encoder.

When the scale has a plurality of tracks, the number of the track for determining final accuracy is one. And so, in at least one of the tracks Tr1 to Tr3, the width of the connection coil 21 in the Y-axis direction is different from the width of other connection coils 21 in the Y-axis direction. In the example of FIG. 5A, the width of the connection coil 21 of the track Tr1 is larger than the widths of the connection coils 21 of the tracks Tr2 and Tr3. In the tracks Tr1 to Tr3, the width of the transceiver coil 11 in the Y-axis direction is substantially the same as the width of the receiver coil 12 in the Y-axis direction. When positional fluctuation does not occur, the scale 20 is positioned at the standard position with respect to the detection head 10.

Figure 6:
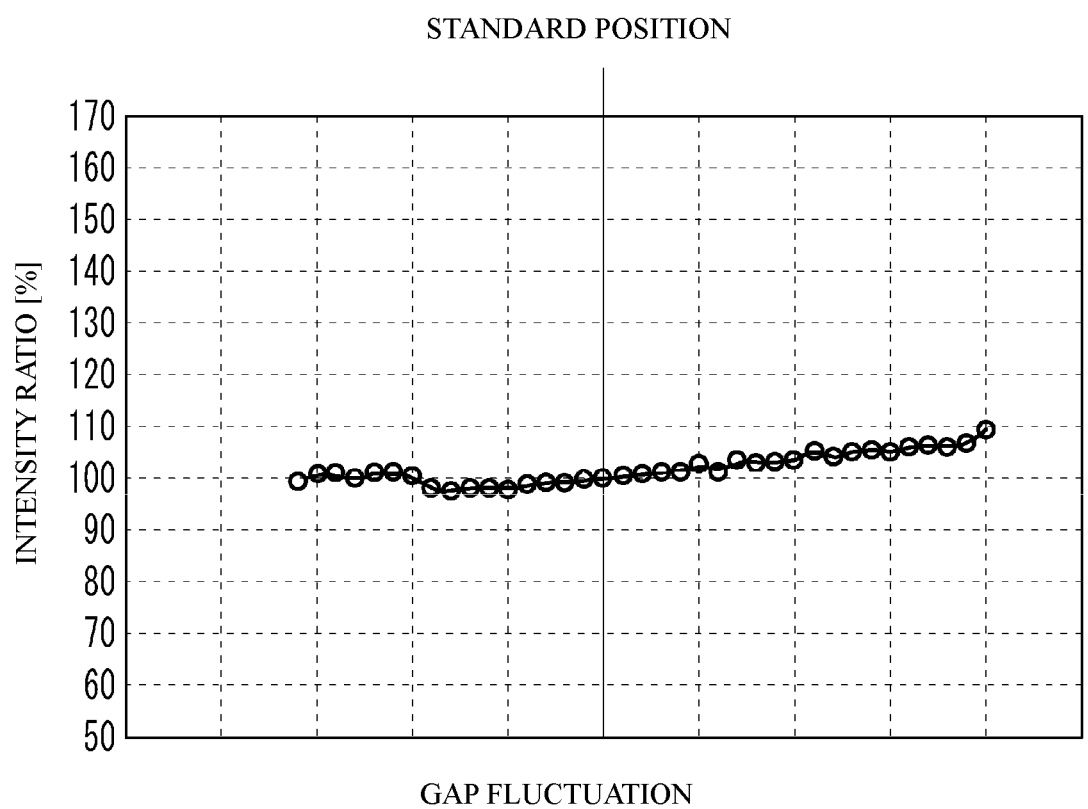
FIG. 6 illustrates a ratio between signal intensity with respect to gap fluctuation of a track Tr1 and signal intensity with respect to gap fluctuation of a track Tr2.

In this case, when the gap between the detection head 10 and the scale 20 fluctuates, fluctuation of the signal intensity of each of the tracks is similar to each other. Therefore, a ratio of the signal intensities of the tracks is approximately constant. As an example, FIG. 6 illustrates a ratio between the signal intensity with respect to the gap fluctuation of the track Tr1 and the signal intensity with respect to the gap fluctuation of the track Tr2. In this manner, a fluctuation rate of the signal intensity with respect to the gap fluctuation of the track Tr1 is approximately the same as a fluctuation rate of the signal intensity with respect to the gap fluctuation of the track Tr2. Therefore, even if anyone of the signal intensity of the track Tr1 and the signal intensity of the track Tr2 is used, it is possible to detect the gap between the detection head 10 and the scale 20.

Figure 7:
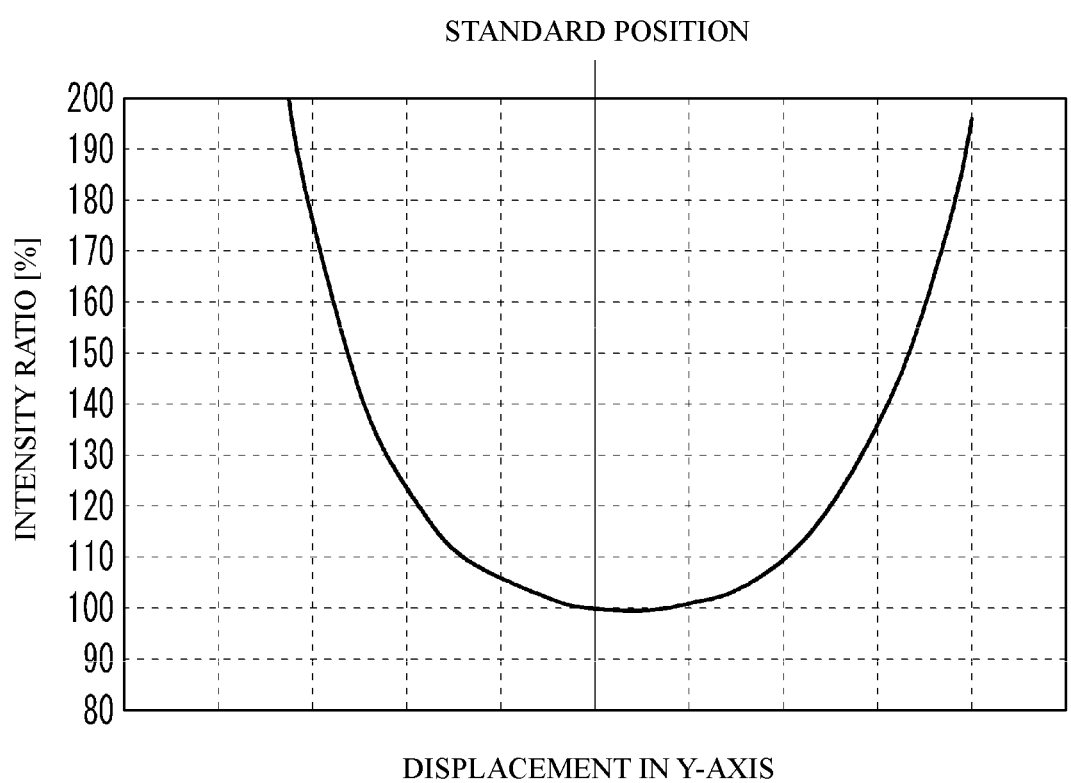
FIG. 7 illustrates a ratio between fluctuation of signal intensity of a track Tr1 and fluctuation of signal intensity of a track Tr2 in displacement in a Y-axis direction.

On the other hand, in the case of the displacement in the Y-axis direction, as illustrated in FIG. 4A and FIG. 4B, the intensity fluctuation of the detection signals of the tracks are different from each other. FIG. 7 illustrates a ratio between the fluctuation of the signal intensity of the track Tr1 and the fluctuation of the signal intensity of the track Tr2 in the displacement in the Y-axis direction. A vertical axis of FIG. 7 indicates (the signal intensity of the track Tr1)/(the signal intensity of the track Tr2). When the displacement amount from the standard position becomes larger, the difference between the signal intensities of the tracks becomes larger.

And so, the fluctuation detector 50 detects the displacement of the scale 20 in the Y-axis direction, with use of the comparison result between the signal intensity of the track Tr1 and the signal intensity of the track Tr2. For example, a relationship between a comparison result between the signal intensity of the track Tr1 and the signal intensity of the track Tr2, and the displacement amount of the scale 20 in the Y-axis direction is stored as a table in advance. In this case, it is possible to detect the displacement amount in the Y-axis direction corresponding to the comparison result between the signal intensity of the track Tr1 and the signal intensity of the track Tr2. A ratio may be used as the comparison result between the signal intensity of the track Tr1 and the signal intensity of the track Tr2. A difference or the like between the signal intensity of the track Tr1 and the signal intensity of the track Tr2 may be used as the comparison result.

Figure 8:
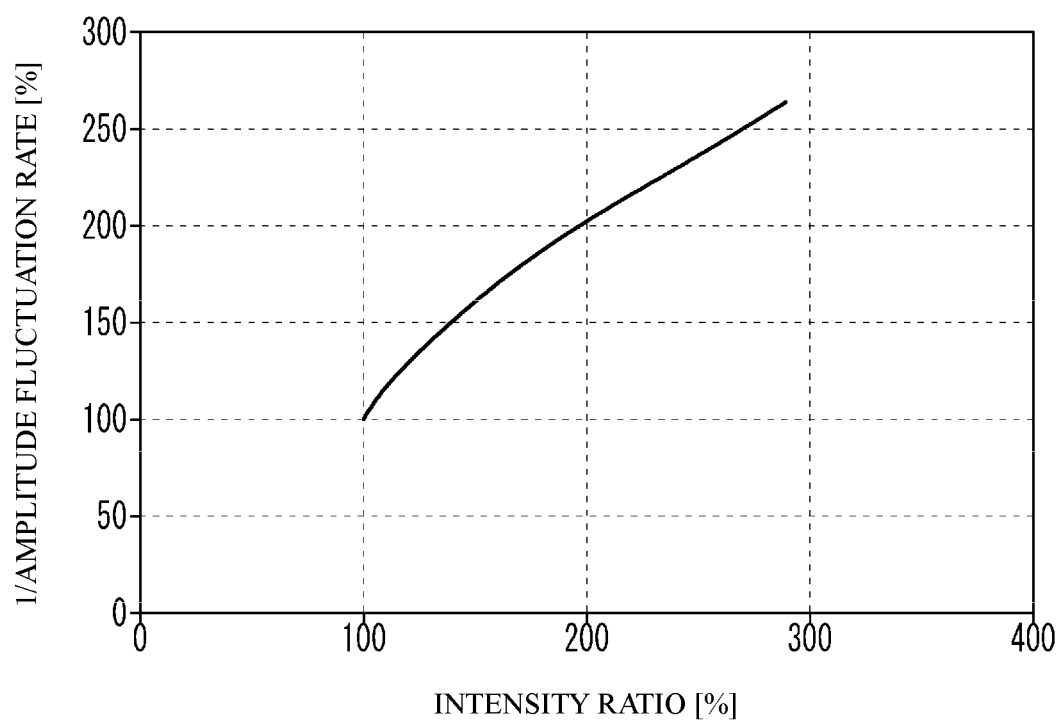
FIG. 8 illustrates a relationship between fluctuation of a ratio between signal intensity of a track Tr1 and signal intensity of a track Tr2 during displacement in a Y-axis direction, and a reciprocal number of signal intensity fluctuation rate of a track Tr1.

Moreover, as illustrated in FIG. 8, the fluctuation detector 50 uses a relationship between the fluctuation of the ratio between the signal intensity of the track Tr1 and the signal intensity of the track Tr2 during the displacement in the Y-axis direction, and a reciprocal number of the signal intensity fluctuation rate of the track Tr1.

Figure 9:
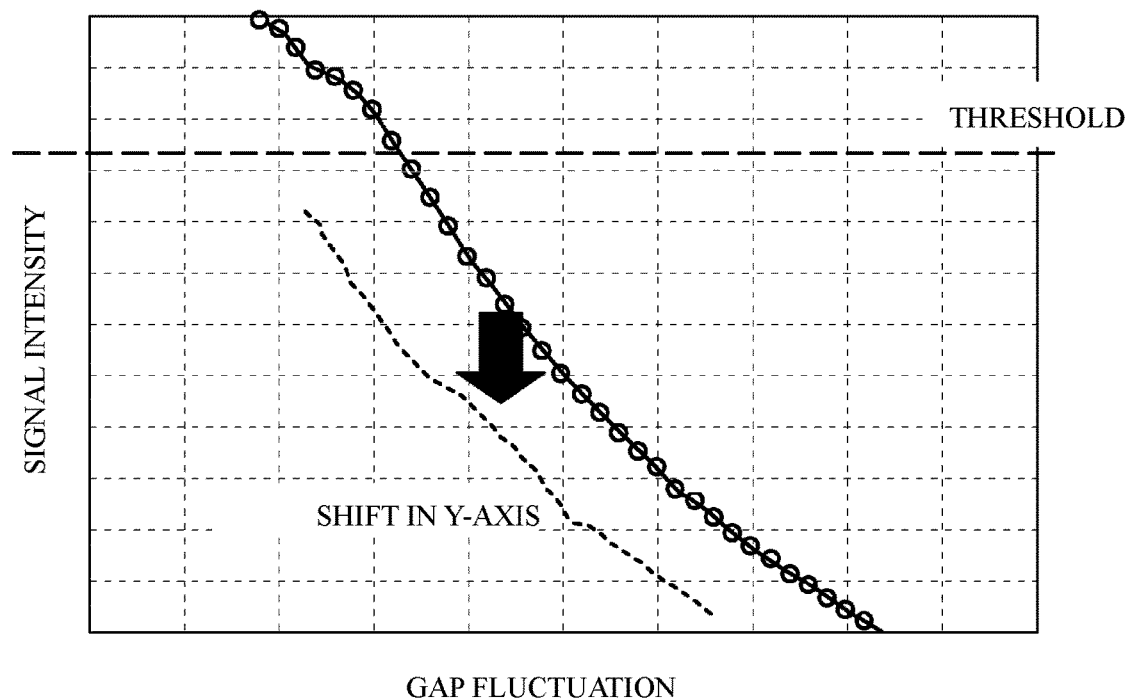
FIG. 9 illustrates reduction of signal intensity in accordance with gap fluctuation.

When the displacement in the Y-axis direction overlaps with the signal intensity in accordance with the gap fluctuation, the signal intensity of the track Tr1 is reduced as illustrated in FIG. 9. Therefore, when a limitation of the gap fluctuation is determined by a threshold of predetermined signal intensity, the signal intensity is lower than the threshold when the gap fluctuates and the displacement in the Y-axis direction occurs. In this case, it is difficult to detect the gap limitation. And so, the reciprocal values obtained in FIG. 8 are stored in advance as correction coefficients of the displacement in the Y-axis direction. The fluctuation detector 50 uses the reciprocal numbers obtained in FIG. 8, as the correction coefficients of the displacement in the Y-axis direction. The fluctuation detector 50 multiplexes the coefficients with the signal intensity of FIG. 9. Thus, the influence of the displacement in the Y-axis direction is suppressed from the signal intensity fluctuation rate of the track Tr1. And, the gap between the detection head 10 and the scale 20 is detected.

When the gap between the detection head 10 and the scale 20 detected by the fluctuation detector 50 is equal to or less than the threshold which indicates the lower limit of the allowable rage of the gap, the alarm device 60 reports the fact. Alternatively, when the displacement amount in the Y-axis direction between the detection head 10 and the scale 20 detected by the fluctuation detector 50 is equal to or more than a threshold, the alarm device 60 reports the fact. For example, the alarm device 60 is an alarm lamp or the like. When the alarm device 60 reports the facts, the alarm device 60 turns on the alarm lamp. It is preferable that the alarm device 60 reports the facts so that the direction of the fluctuation can be realized. Thus, the alarm device 60 acts as a positional fluctuation detection function. Alternatively, the alarm device 60 is a communication interface or the like. The alarm device 60 outputs an alarm signal to outside via an electrical communication line such as Internet, when the gap between the detection head 10 and the scale 20 detected by the fluctuation detector 50 is equal to or less than a threshold or the displacement amount in the Y-axis direction detected by the fluctuation detector 50 is equal to or more than a threshold. The alarm device 60 may report the fact even if the detected gap between the detection head 10 and the scale 20 is equal to or more than a threshold indicating the upper limit of the allowable range. In this case, it is possible to report the fact that the signal intensity is reduced.

In the embodiment, it is possible to detect the positional fluctuation between the detection head 10 and the scale 20, without newly mounting another sensor. It is therefore possible to detect the positional fluctuation with the simple structure.

Figure 10A:
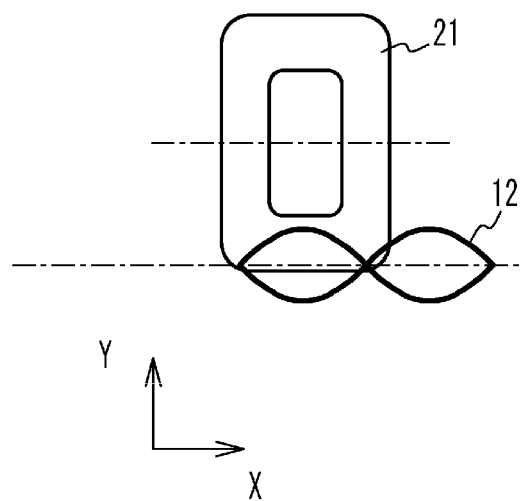
FIG. 10A illustrates a receiver coil of a track Tr2.
Figure 10B:
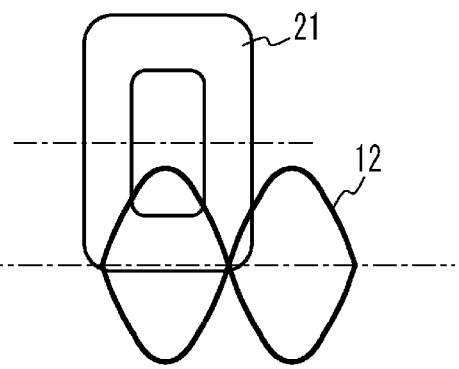
FIG. 10B illustrates a receiver coil of a track Tr1.

(Second embodiment) In the first embodiment, the widths of the connection coils in the Y-axis direction are different from each other between the tracks. However, the structure is not limited. In a second embodiment, the widths of the receiver coils 12 in the Y-axis direction are different from each other between the tracks. FIG. 10A illustrates the receiver coil 12 of the track Tr2. FIG. 10B illustrates the receiver coil 12 of the track Tr1. As illustrated in FIG. 10A and FIG. 10B, the width of the receiver coil 12 of the track Tr1 in the Y-axis direction is larger than the width of the receiver coil 12 of the track Tr2 in the Y-axis direction. Among the tracks Tr1 to Tr3, the widths of the transceiver coils 11 in the Y-axis direction are substantially the same as each other. Moreover, among the tracks Tr1 to Tr3, the widths of the connection coil 21 in the Y-axis direction are substantially the same as each other. In the structure, when the scale 20 moves in the Y-axis direction with respect to the detection head 10, the signal intensity of the track Tr1 is different from the signal intensity of the track Tr2. The fluctuation detector 50 detects the positional fluctuation between the detection head 10 and the scale 20, with use of the comparison result between the signal intensities.

Figure 11A:
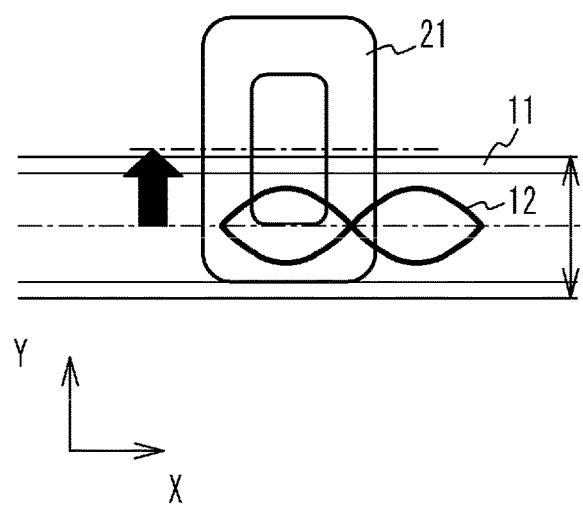
FIG. 11A illustrates a transceiver coil in a track Tr2.
Figure 11B:
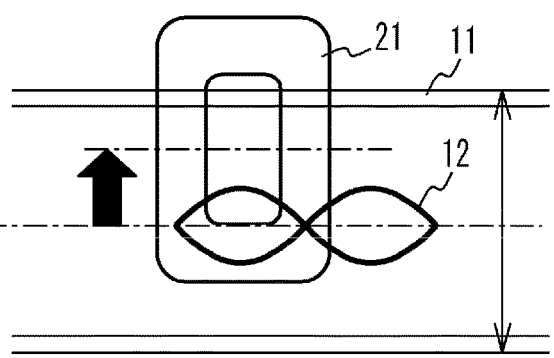
FIG. 11B illustrates a transceiver coil in the track Tr1.

(Third embodiment) In a third embodiment, the widths of the transceiver coils 11 of the tracks in the Y-axis direction are different from each other. FIG. 11A illustrates the transceiver coil 11 in the track Tr2. FIG. 11B illustrates the transceiver coil 11 in the track Tr1. As illustrated in FIG. 11A and FIG. 11B, the width of the transceiver coil 11 of the track Tr1 in the Y-axis direction is larger than the width of the transceiver coil 11 of the track Tr2 in the Y-axis direction. In the tracks Tr1 to Tr3, the widths of the receiver coils 12 in the Y-axis direction are substantially the same as each other. And, in the tracks Tr1 to Tr3, the widths of the connection coils 21 in the Y-axis direction are substantially the same as each other. In this case, when the scale 20 moves in the Y-axis direction with respect to the detection head 10, the signal intensity of the track Tr1 is different from the signal intensity of the track Tr2. The fluctuation detector 50 can detect the positional fluctuation between the detection head 10 and the scale 20 by using the comparison results of the signal intensities.

In the above-mentioned embodiments, the connection coil is used as a member which is electromagnetically coupled with the transceiver coil 11 and the receiver coil 12. However, the structure is not limited. For example, a conductor which is electromagnetically coupled with the transceiver coil 11 and the receiver coil 12 can be used even if the conductor does not have a coil shape. For example, a rectangular conductor may be used.

In the above-mentioned embodiments, it is preferable that the width of the connection coil 21 in the Y-axis direction is smaller than the width of the transceiver coil 11 in the Y-axis direction. This is because when the connection coil 21 protrudes from the transceiver coil 11, magnetic field from the transceiver coil 11 is canceled in the protruded portion and the signal intensity may be reduced.

In the above-mentioned embodiments, the linear encoders of electromagnetic induction type are described. The embodiments may be applied to a rotary encoder of electromagnetic induction type. When the embodiments are applied to the rotary encoder, the measurement axis of the embodiments is a measurement direction.

In the above-mentioned embodiments, the detection head 10 and the scale 20 act as a detection head and a scale that faces with the detection head and is configured to relatively move with respect to the detection head in a measurement direction. The transceiver coil 11 acts as a first transceiver coil that is used for a first track and is configured to generate magnetic flux and a second transceiver coil that is used for a second track and is configured to generate magnetic flux. The connection coil 21 acts a first plurality of conductors that are used for the first track, are arrayed in the measurement direction, are configured to be electromagnetically coupled with the magnetic flux generated by the first transceiver coil, and generate magnetic flux that fluctuates in a predetermined spatial period in the measurement direction and a second plurality of conductors that are used for the second track, are arrayed in the measurement direction, are configured to be electromagnetically coupled with the magnetic flux generated by the second transceiver coil, and generate magnetic flux that fluctuates in a predetermined spatial period in the measurement direction. The receiver coil 12 acts as a first receiver coil configured to be electromagnetically coupled with the magnetic flux generated by the first plurality of conductors and detect a phase of the magnetic flux and a second receiver coil configured to be electromagnetically coupled with the magnetic flux generated by the second plurality of conductors and detect a phase of the magnetic flux. The fluctuation detector 50 acts as a detector configured to detect at least one of positional fluctuation between the detection head and the scale in the facing direction and positional fluctuation between the detection head and the scale in a direction vertical to the facing direction and the measurement direction, with use of comparison result between signal intensity obtained from the first receiver coil of the first track and signal intensity obtained from the second receiver coil of the second track. The alarm device 60 acts as an alarm device configured to report a result of the detector.

The present invention is not limited to the specifically disclosed embodiments and variations but may include other embodiments and variations without departing from the scope of the present invention.

What is claimed is:
1. An electromagnetic induction type encoder comprising:
a detection head; and
a scale that faces with the detection head and is configured to relatively move with respect to the detection head in a measurement direction,
wherein the detection head has a first transceiver coil that is used for a first track and is configured to generate magnetic flux and a second transceiver coil that is used for a second track and is configured to generate magnetic flux,
wherein the scale has a first plurality of conductors that are used for the first track, are arrayed in the measurement direction, are configured to be electromagnetically coupled with the magnetic flux generated by the first transceiver coil, and generate magnetic flux that fluctuates in a predetermined spatial period in the measurement direction and a second plurality of conductors that are used for the second track, are arrayed in the measurement direction, are configured to be electromagnetically coupled with the magnetic flux generated by the second transceiver coil, and generate magnetic flux that fluctuates in a predetermined spatial period in the measurement direction,
wherein the detection head has a first receiver coil configured to be electromagnetically coupled with the magnetic flux generated by the first plurality of conductors and detect a phase of the magnetic flux and a second receiver coil configured to be electromagneti- cally coupled with the magnetic flux generated by the second plurality of conductors and detect a phase of the magnetic flux, wherein at least one of widths of the first transceiver coil, the first plurality of conductors and the first receiver coil of the first track in the direction vertical to the facing direction between the detection head and the scale and the measurement direction is different from corresponding width of the second transceiver coil, the second plurality of conductors and the second receiver coil in the direction vertical to the facing direction and the measurement direction.

2. The electromagnetic induction type encoder as claimed in claim 1, further comprising a detector configured to detect at least one of positional fluctuation between the detection head and the scale in the facing direction and positional fluctuation between the detection head and the scale in a direction vertical to the facing direction and the measurement direction, with use of comparison result between signal intensity obtained from the first receiver coil of the first track and signal intensity obtained from the second receiver coil of the second track.

3. The electromagnetic induction type encoder as claimed in claim 2, wherein the detector detects a gap between the detection head and the scale, with use of a correction coefficient corresponding to the comparison result between the signal intensity obtained from the first receiver of the first track and the signal intensity obtained from the second receiver coil of the second track.

4. The electromagnetic induction type encoder as claimed in claim 2, further comprising an alarm device configured to report a result of the detector.

5. The electromagnetic induction type encoder as claimed in claim 1,
  wherein a width of the first plurality of conductors of the first track is smaller than a width of the first transceiver coil in the direction vertical to the facing direction and the measurement direction,
  wherein a width of the second plurality of conductors of the second track is smaller than a width of the second transceiver coil in the direction vertical to the facing direction and the measurement direction.

* * * * *